United States Patent
Chen et al.

(10) Patent No.: US 9,122,345 B2
(45) Date of Patent: Sep. 1, 2015

(54) METHOD OF DETERMINING TOUCH GESTURE AND TOUCH CONTROL SYSTEM

(71) Applicant: Wistron Corporation, New Taipei (TW)

(72) Inventors: Shih-Wen Chen, New Taipei (TW); Yu-Yen Chen, New Taipei (TW); Chun-Chao Chang, New Taipei (TW)

(73) Assignee: Wistron Corporation, Hsichih, New Taipei (TW)

(*) Notice: Subject to any disclaimer, the term of this patent is extended or adjusted under 35 U.S.C. 154(b) by 227 days.

(21) Appl. No.: 14/034,526

(22) Filed: Sep. 23, 2013

(65) Prior Publication Data

US 2014/0320457 A1    Oct. 30, 2014

(30) Foreign Application Priority Data

Apr. 29, 2013    (TW) .............................. 102115248 A (51) Int. Cl.
   *G06F 3/041*    (2006.01)
   *G06F 3/042*    (2006.01)
   *G06F 3/0488*    (2013.01)

(52) U.S. Cl.
   CPC ............ *G06F 3/0416* (2013.01); *G06F 3/0421* (2013.01); *G06F 3/0488* (2013.01); *G06F 2203/04104* (2013.01)

(58) Field of Classification Search
   CPC ... G06F 3/04865; G06F 3/0487; G06F 3/044; G06F 3/04875; G06F 3/045
   USPC ................... 345/173–179; 178/18.01–18.04
   See application file for complete search history.

(56) References Cited

U.S. PATENT DOCUMENTS

| | | | |
|---|---|---|---|
| 8,339,374 B2* | 12/2012 | Chang et al. .................. | 345/173 |
| 2010/0071965 A1* | 3/2010 | Hu et al. ..................... | 178/18.06 |
| 2011/0102339 A1* | 5/2011 | Lin et al. ....................... | 345/173 |
| 2012/0174043 A1* | 7/2012 | Queru ........................... | 715/863 |
| 2013/0120279 A1* | 5/2013 | Plichta et al. ................. | 345/173 |
| 2013/0174100 A1* | 7/2013 | Seymour et al. .............. | 715/863 |
| 2013/0222275 A1* | 8/2013 | Byrd et al. .................... | 345/173 |
| 2014/0071171 A1* | 3/2014 | McGowan et al. ........... | 345/661 |
| 2014/0157209 A1* | 6/2014 | Dalal et al. .................... | 715/863 |
| 2014/0298266 A1* | 10/2014 | Lapp ............................. | 715/835 |

* cited by examiner

*Primary Examiner* — Kimnhung Nguyen
(74) *Attorney, Agent, or Firm* — Winston Hsu; Scott Margo (57) ABSTRACT

A method of determining a touch gesture is utilized for a touch control system. The method includes detecting at least one first touch point on a touch surface corresponding to the touch gesture at a first time point to generate a first detecting result; detecting at least one second touch point on the touch surface corresponding to the touch gesture at a second time point to generate a second detecting result; obtaining a moving vector and a distributing variation corresponding to the touch gesture according to a relationship of the first detecting result and the second detecting result; and determining the touch gesture on the touch surface according to the moving vector and the distributing variation.

23 Claims, 7 Drawing Sheets

METHOD OF DETERMINING TOUCH GESTURE AND TOUCH CONTROL SYSTEM

BACKGROUND OF THE INVENTION

1. Field of the Invention

The present invention relates to a method of determining a touch gesture and a touch control system, and more particularly, to a method of determining a touch gesture and a touch control system capable of easily determining a multi-touch gesture.

2. Description of the Prior Art

In general, an optical, a capacitive, or a resistive touch device may generate touch control signals corresponding to touch events performed by a user, and determine the touch events by the touch control signals. For example, when the user utilizes fingers to perform touch gestures with various sequences of pointing, clicking, dragging or moving, etc., on the touch device, the touch device may detect touch points corresponding to the fingers to generate the touch control signals. Then, the touch device determines positions of the touch points corresponding to the touch gestures according to the touch control signals.

Figure 1:
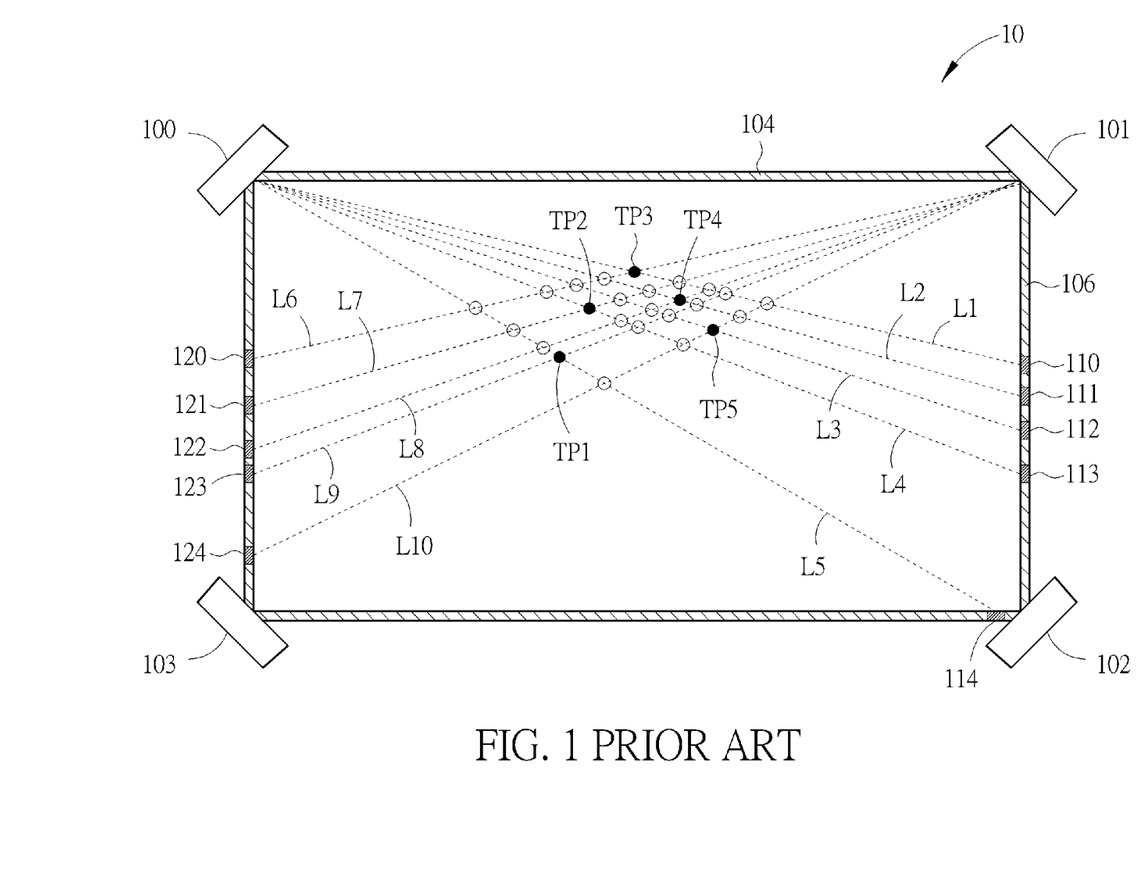
FIG. 1 is a schematic diagram of a conventional touch device.

For the optical touch device, detection of the touch points is performed by detectors, which are disposed around a screen of the optical touch device. Please refer to FIG. 1, which is a schematic diagram of a conventional optical touch device 10. As shown in FIG. 1, the optical touch device 10 may be an optical touch computer or an optical touch smart television, which comprise detectors 100-103, a screen 104 and four reflective bars 106 disposed around the screen 104. The screen 104 is utilized for displaying pictures and provided for the user to perform touch control and interaction according to the displaying pictures. The detectors 100-103 are disposed on four corners of the screen 104. The detectors 100-103 have light emitting elements (such as light emitting diodes) and may emit light (such as infrared light) to the reflective bars 106 around the screen 104 and illuminate the reflective bars 106. Simultaneously, the detectors 100-103 also have sensing components (such as charge coupled devices, i.e. CCDs) and may sense light reflected from the reflective bars 106.

Thereby, when touch objects (such as the user fingers) are touched on the screen 104, the light reflected from the reflective bars 106 may be blocked by the touch objects, and shadows are caused due to the blocking of the reflected light. At the same time, the detectors 100-103 may sense the reflected light from the reflective bars 106 to convert as signals. By determining waveforms and amplitudes of the signals, sharply falling positions of the waveforms may be founded to obtain positions of the shadows, so as to calculate positions of the touch objects on the screen 104.

In general, if only two detectors are respectively disposed on upper-left and upper-right corners of the optical touch device, only positions of two touch objects may be accurately analyzed and determined. In such a situation, when positions of more than two touch objects are wanted to be determined, more than two detectors are required for detecting the touch objects to obtain more signals corresponding to the touch objects, and the signals are also required to be determined by utilizing more complex algorithms, so as to accurately determine the positions of the touch objects.

As shown in FIG. 1, the user utilizes five fingers to respectively generate touch points TP1-TP5 (such as round solid dots in FIG. 1) on the screen 104. Regarding the detector 100, since the five fingers block the light reflected from the right-side and bottom-side reflective bars 106, shadows 110-114 are correspondingly generated falling on the reflective bars 106 due to the blocking of the reflected light. The detector 100 may sense the shadows 110-114 and analyze corresponding signals to obtain positions of the shadows 110-114. Similarly, regarding the detector 101, since the fingers also block the light reflected from the left-side and bottom-side reflective bars 106, shadows 120-124 are correspondingly generated falling on the reflective bars 106 due to the blocking of the reflected light. The detector 101 may also sense the shadows 120-124 and analyze corresponding signals to obtain positions of the shadows 120-124.

In such a condition, positions of the touch points TP1-TP5 may be determined by utilizing mathematical calculation. For example, line equations of light-blocked lines L1-L5 formed between the shadows 110-114 and the detector 100 and line equations of light-blocked lines L6-L10 formed between the shadows 120-124 and the detector 101 are calculated first. Then, cross points of the light-blocked lines L1-L5 and the light-blocked lines L6-L10 may be calculated and positions of twenty five detected points are obtained. The twenty five detected points comprise real points TP1-TP5 and other non-real detected points (such as round hollow dots), which are called as ghost points.

As can be seen, when the multi-touch gestures having more than two touch points are performed on the optical touch device, which only has the two detectors, the optical touch device only may obtain the positions of the detected points mixing the multiple real points and the multiple ghost points according to simple signal determining methods with the mathematical calculation. The optical touch device may not easily determine the real points among the detected points.

Thus, the conventional optical touch device requires utilizing more detectors for detecting and obtaining more signals corresponding to the touch points to determine the positions of the multiple real points according to intensity distribution or other features of the signals by the more complex determining algorithms. However, when more detectors are utilized, relatively higher hardware cost is required, and when the more complex determining algorithms are utilized, more powerful hardware logic circuits are also required for implementation.

Therefore, there is a need to provide an easily determining method for determining the multi-touch gestures.

SUMMARY OF THE INVENTION

It is therefore an objective of the present invention to provide a method of determining a touch gesture and a touch control system capable of easily determining a multi-touch gesture for reducing determining hardware cost and complexity to save power.

The present invention discloses a method of determining a touch gesture for a touch control system. The method comprises detecting at least one first touch point corresponding to the touch gesture on a touch surface at a first time point to generate a first detecting result; detecting at least one second touch point corresponding to the touch gesture on the touch surface at a second time point to generate a second detecting result; obtaining a moving vector and a distributing variation corresponding to the touch gesture according to a relationship of the first detecting result and the second detecting result; and determining the touch gesture on the touch surface according to the moving vector and the distributing variation.

The present invention further discloses a touch control system comprising a detection module, for detecting at least one touch point; and a determination device, comprising a processor; and a storage device storing a program code for indicating to the processor to perform a method of determining a touch gesture, and the method comprising receiving a first detecting result generated by the detection module detecting at least one first touch point corresponding to the touch gesture on a touch surface at a first time point; receiving a second detecting result generated by the detection module detecting at least one second touch point corresponding to the touch gesture on the touch surface at a second time point; obtaining a moving vector and a distributing variation corresponding to the touch gesture according to a relationship of the first detecting result and the second detecting result; and determining the touch gesture on the touch surface according to the moving vector and the distributing variation.

These and other objectives of the present invention will no doubt become obvious to those of ordinary skill in the art after reading the following detailed description of the preferred embodiment that is illustrated in the various figures and drawings.

DETAILED DESCRIPTION

Figure 2:
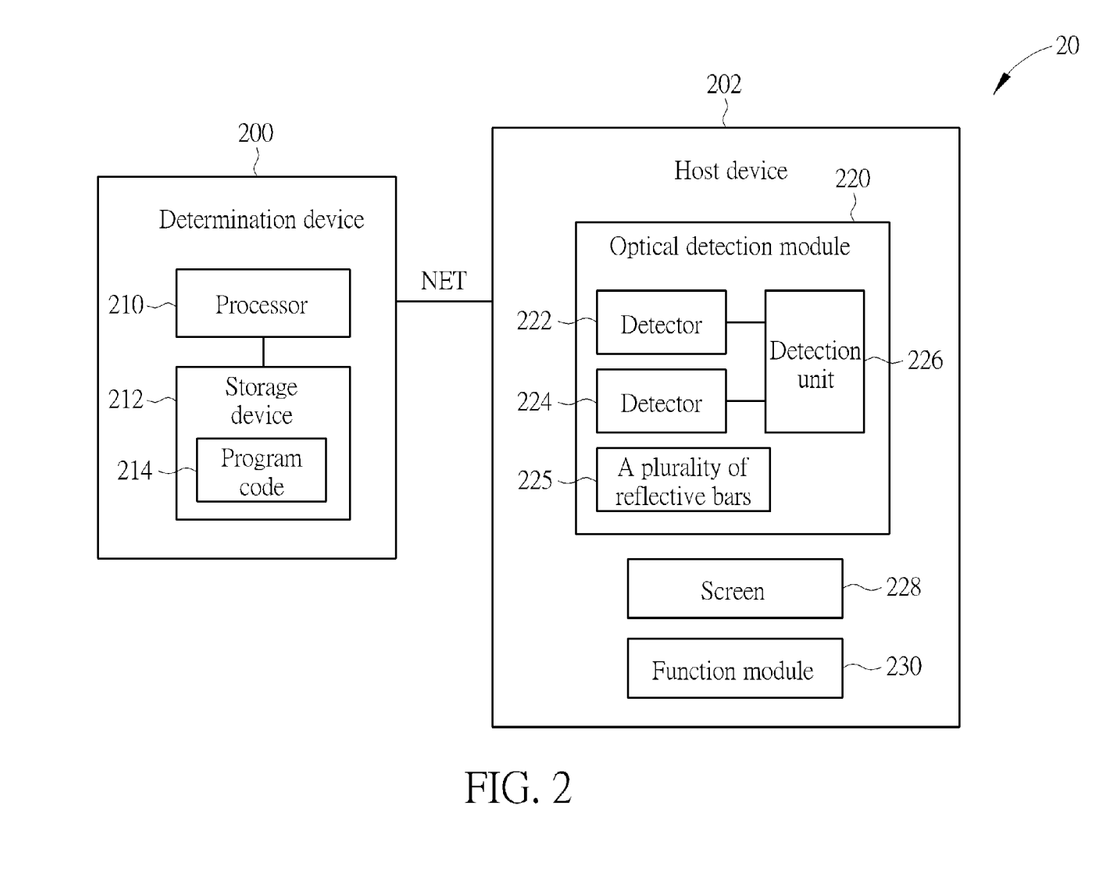
FIG. 2 is a schematic diagram of a touch control system according to an embodiment of the present invention.

Please refer to FIG. 2, which is a schematic diagram of a touch control system 20 according to an embodiment of the present invention. As shown in FIG. 2, the touch control system 20 includes a determination device 200 and a host device 202. The host device 202 is an optical touch device in an embodiment of the present invention and includes an optical detection module 220, a screen 228, and a function module 230. The host device 202 may be the commonly-seen touch device, such as an optical touch computer, or an optical touch smart television, etc and may also be a touch device of another type, which is not limited herein. The screen 228 may be a display device such as a liquid crystal display panel, a light-emitting diode display panel, or a projective screen, etc. The screen 228 may also be a simple writing board in other applications of the touch control system 20, such as an electronic whiteboard. In such a situation, the screen 228 not only displays pictures, but also provides input from a user. The displaying screen or the writing board may be collectively regarded as a touch surface.

The host device 202 displays the pictures with the screen 228, and performs relative operations with the function module 230. For example, when the host device 202 is the optical touch computer, the host device 202 performs the relative computer operations, such as executing an operating system, connecting to Internet, or operating files, etc, with the function module 230, and the host device 202 displays window pictures on the screen 228. The optical detection module 220 includes two detectors 222, 224, a plurality of reflective bars 225, and a detection unit 226. The optical detection module 220 is utilized for detecting touch points corresponding to a touch gesture performed by the user on the screen 228. The detectors 222, 224 are disposed on two corners of the same side of the screen 228. Generally the detectors 222, 224 are disposed on left and right corners of top side of the screen 228, and are not limited herein. The detectors 222, 224 have light emitting elements, such as light emitting diodes, which may emit light, such as infrared light, and have sensing components, such as charge coupled devices (CCDs), which may sense light to convert as signals. The plurality of reflective bars 225 are disposed around the screen 228. For example, when the screen 228 is rectangular, the plurality of reflective bars 225 are disposed on the top, bottom, left, and right side of the screen 228. Noticeably, the light emitting elements of the detectors 222, 224 may also be integrated with the sensing components to form single modules, or may be separated from the sensing components to be disposed at other proper positions for emitting light to the reflective bars 225. The detection unit 226 is utilized for determining signals generated from the detectors 222, 224 to obtaining positions of the touch points.

In detail, the optical detection module 220 has the two detectors 222, 224. When the user performs the touch gesture on the screen 228 of the host device 202, touch objects corresponding to the touch gesture may block light, which is emitted by the detectors 222, 224 and reflected from the plurality of reflective bars 225, to generate shadows falling on the plurality of reflective bars 225 around the screen 228 due to the blocking of the reflected light. Next, the detectors 222, 224 may sense intensity of the reflected light to convert as signals to the detection unit 226. Then, the detection unit 226 compares waveforms of the signals with a threshold and determines sharply falling areas of the waveforms as the shadows to obtain positions of the shadows generated by the touch objects. Moreover, since light-blocked lines are formed between the positions of the shadows and the detectors 222, 224, the detection unit 226 may calculate cross points of the light-blocked lines to obtain detected points. Under such a condition, since the touch gesture is a multi-touch gesture having more than two touch points, and the optical detection module 220 of the host device 202 only has the two detectors 222, 224, a detecting result generated by the host device 202 may only include positions of the all detected points mixing multiple real points and multiple ghost points corresponding to the touch gesture.

Moreover, the host device 202 communicates with the determination device 200 by a transmission media NET, and the host device 202 transmits the detecting result (including the positions of the real points and the ghost points) to the determination device 200. The transmission media NET may be utilized for transmission according to an universal serial bus (USB) standard, or another standard, such as inter-integrated circuit ($I^2C$), etc, which is not limited.

The determination device 200 includes a processor 210 and a storage device 212. The processor 210 may be a microprocessor or an application specific integrated circuit (ASIC). The storage device 212 may be any data storage device, such as a read-only memory (ROM), a random-access memory (RAM), a CD-ROM, a magnetic tape, a floppy disk, or an optical data storage device, etc, and is not limited herein. The determination device 200 receives the detecting result, which is detected by the optical detection module 220 in the host device 202, corresponding to the touch gesture through the transmission media NET. Then, a program code 214 stored in the storage device 212 indicates to the processor 210 to perform a process of determining the touch gesture according to the received detecting result.

In addition, the determination device 200 may determine a command corresponding to the touch gesture according to a requirement of the host device 202, and the determination device 200 transmits information corresponding to the command to the host device 202 by the transmission media NET. Thereby, the touch gesture performed by the user may be determined to convert as the command for controlling operations of the host device 202. For example, if the host device 202 is the optical touch computer, when the user performs a right-moving touch gesture on the host device 202, the determination device 200 may determine the touch gesture as a control command for switching windows according to a command setting of the host device 202, and the determination device 200 transmits control information corresponding to the control command to the host device 202 to control the host device 202. On the other hand, the determination device 200 may also determine the touch gesture as a coordinate command for transmitting coordinates of the touch points, and the determination device 200 transmits coordinate information corresponding to the coordinate command to the host device 202 to tell the host device 202 the coordinates of the touch points corresponding to the touch gesture.

Furthermore, the host device 202 performs the operations corresponding to the information transmitted from the determination device 200, such that the user may operate the host device 202 by performing the touch gesture. For example, when the host device 202 is the optical touch television, the host device 202 performs functionalities of modulation/demodulation or Internet connection with the function module 230. In addition, the host device 202 may configure the touch gesture as the control command and the host device 202 provides the user an interface to control tuning of programs by the touch gesture according to the control information transmitted from the determination device 200. Moreover, the host device 202 may also configure the touch gesture as the coordinate command and the host device 202 provides the user with an interface to select and open windows by the touch gesture according to the coordinates of the touch points transmitted from the determination device 200.

In the touch control system 20, the host device 202 has the detectors 222, 224 to detect the positions of the detected points mixing the real points and the ghost points corresponding to the touch gesture, and the host device 202 transmits the detecting result to the determination device 200. Thereby, the determination device 200 receives the detecting result and performs a process of determining the touch gesture to determine the command corresponding to the touch gesture. After the determination device 200 determines the command corresponding to the touch gesture, the determination device 200 transmits the information corresponding to the command to the host device 202 for controlling the host device 202.

In detail, the determination device 200 receives the detecting result from the host device 202 to determine the touch gesture, and when the touch gesture is a multi-touch gesture having more than two touch points, the detecting result of the host device 202 is the positions of the detected points mixing the multiple real points and the multiple ghost points. Please refer to FIG. 3, which is a schematic diagram of a process 30 for determining the touch gesture according to an embodiment of the present invention. In the embodiment, the process 30 is performed in the determination device 200 in FIG. 2 and the process 30 may be compiled as the program code 214 to be stored in the storage device 212 for controlling the processor 210 to perform process 30.

Figure 3:
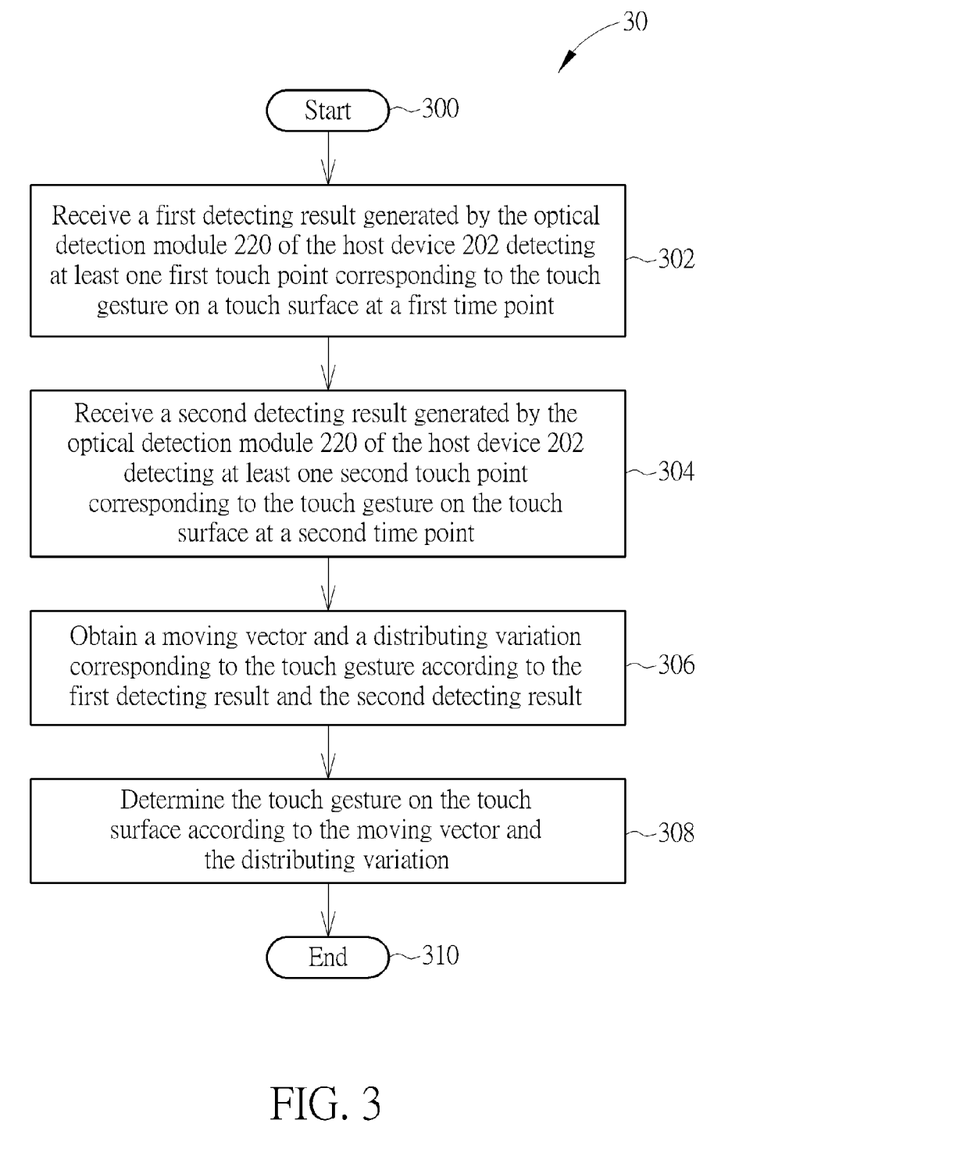
FIG. 3 is a schematic diagram of a process according to an embodiment of the present invention.

As shown in FIG. 3, the process 30 includes the following steps:

Step 300: start.

Step 302: receive a first detecting result generated by the optical detection module 220 of the host device 202 detecting at least one first touch point corresponding to the touch gesture on a touch surface at a first time point.

Step 304: receive a second detecting result generated by the optical detection module 220 of the host device 202 detecting at least one second touch point corresponding to the touch gesture on the touch surface at a second time point.

Step 306: obtain a moving vector and a distributing variation corresponding to the touch gesture according to the first detecting result and the second detecting result.

Step 308: determine the touch gesture on the touch surface according to the moving vector and the distributing variation.

Step 310: end.

According to the process 30, at the first time point, a first representative position may be determined for representing an overall position of the at least one first touch point according to positions of the at least one first touch point (i.e. the detected points mixing the real points and the ghost points) corresponding to the touch gesture in the first detecting result, and a first distributing average may be determined for representing a distributing degree of the at least one first touch point according to at least one relative distance between the at least one first touch point and the first representative position. Similarly, at the second time point, a second representative position may be determined for representing an overall position of the at least one second touch point according to positions of the at least one second touch point (i.e. the detected points mixing the real points and the ghost points) corresponding to the touch gesture in the second detecting result, and a second distributing average may be determined for representing a distributing degree of the at least one second touch point according to at least one relative distance between the at least one second touch point and the second representative position.

Then, a direction and a value of the moving vector are respectively a direction and a distance from the first representative position to the second representative position for representing an overall moving direction and distance of the detected points (mixing the real points and the ghost points) corresponding to the touch gesture from the first time point to the second time point. Moreover, a ratio of the second distributing average relative to the first distributing average is the distributing variation for representing a variation, such as extension or reduction, of the overall distributing degree of the detected points (mixing the real points and the ghost points) corresponding to the touch gesture from the first time point to the second time point.

Thereby, the touch gesture may be determined according to the value of the moving vector. When the value of the moving vector is greater than a moving judgment value, the touch gesture is determined as a moving gesture. When the value of the moving vector is less than the moving judgment value, the touch gesture is determined as a zooming gesture or a meaningless gesture caused by slight shakes of the fingers. Furthermore, when the touch gesture is determined as the moving gesture, a moving direction of the touch gesture may be determined according to the direction of the moving vector. When the touch gesture is determined as the zooming gesture, the zooming gesture may be further determined as a zoom-in gesture or a zoom-out gesture. When the distributing variation is greater than a zooming judgment value, the touch gesture is determined as the zoom-in gesture. When the distributing variation is less than the zooming judgment value, the touch gesture is determined as the zoom-out gesture.

In short, in process 30, the touch control system 20 may easily determine the touch gesture as the moving gesture, the zoom-in gesture, or the zoom-out gesture by the determination device 200 receiving the moving vector and the distributing variation corresponding to the touch gesture detected from the optical detection module 220 within a period. Thus, the touch control system 20 does not require additional detectors and complex algorithms to determine the positions of the real points, and the touch control system 20 may obtain a basic gesture corresponding to the touch gesture. As a result, a hardware cost and a calculating complexity of the touch control system 20 is relatively reduced to save power.

Specifically, the present invention does not require accurately determining the coordinates of the real points, and the present invention only detects a moving motion or a zooming motion corresponding to the touch gesture by the two detectors. In other word, when the touch gesture is the multi-touch gesture, the detecting result of the host device 202 is a detecting result of the detected points corresponding to the touch gesture. Since the detected points mix the multiple real points and the multiple ghost points, the multiple real points may not easily be determined among the detected points. Therefore, the present invention utilizes the moving vector for representing the overall moving direction and distance of the detected points in the detecting result within a period, and utilizes the distributing variation for representing the variation of the variation of the overall distributing degree of the detected points in the detecting result within the period.

In an embodiment, three touch points are utilized for explaining the determination of the moving vector and the distributing variation corresponding to the multi-touch gesture, and actually one, two, or more touch points may also be applied. Those skilled in the art can make modifications or alterations accordingly, and is not limited herein.

Figure 4:
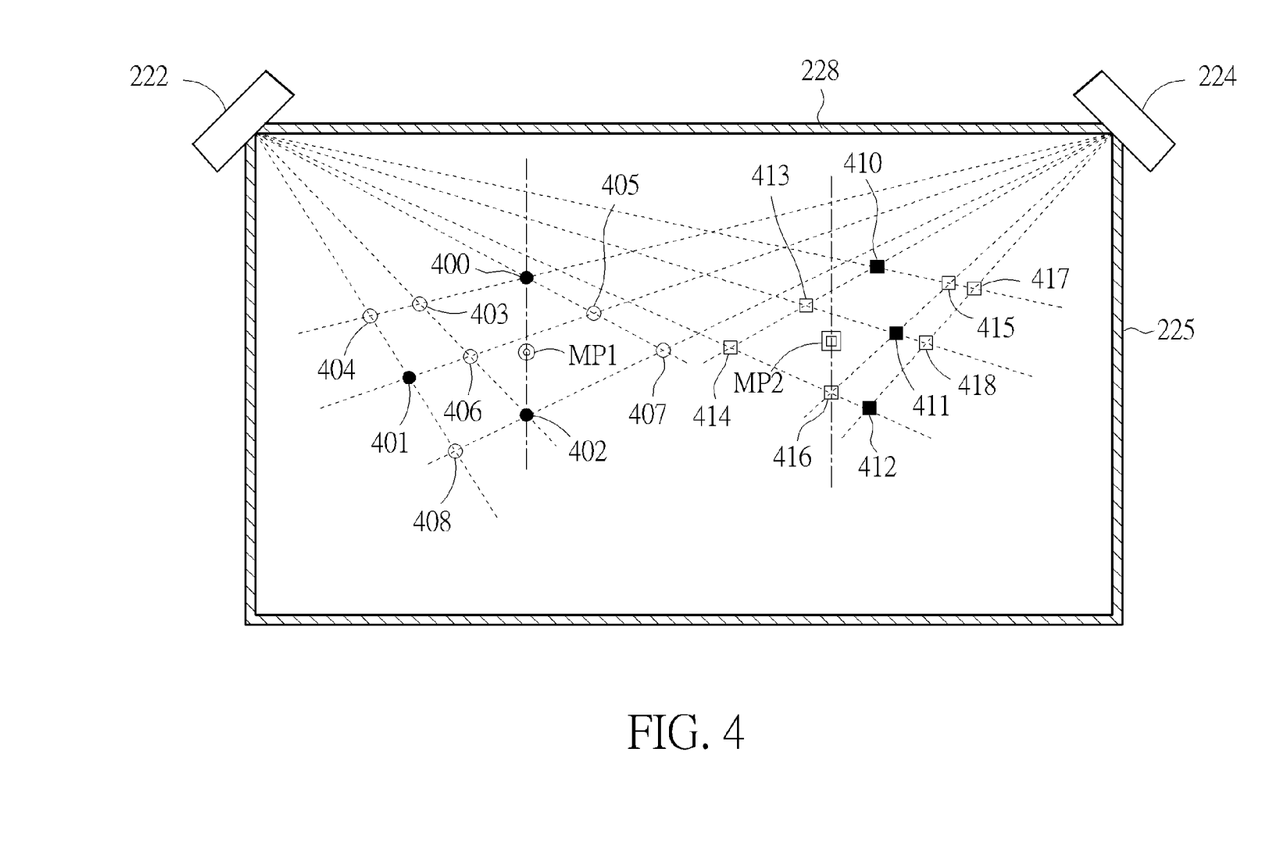
FIG. 4 is a schematic diagram of a touch device in FIG. 2.

In detail, please refer to FIG. 4, which is a schematic diagram of the host device 202 in FIG. 2. As shown in FIG. 4, at the first time point, real points 400-402 (i.e. round solid dots in FIG. 4) are located on the screen 228 of the host device 202. The detectors 222, 224 may detect the reflected light blocked by the real points 400-402 and determine the positions of the detected points mixing the real points 400-402 and ghost points 403-408 (i.e. round hollow dots in FIG. 4). Then, a gravity center coordinate of the detected points mixing the real points 400-402 and the ghost points 403-408 may be calculated by a well-known gravity center formula according to a defined axis to obtain a first representative position MP1 for representing an overall position of the real points 400-402 and the ghost points 403-408.

At the second time point, the real points 400-402 move to real points 410-412 (i.e. square solid dots in FIG. 4) due to the touch gesture performed by the user. Similarly, the detectors 222, 224 may detect the reflected light blocked by the real points 410-412, and determine the positions of the detected points mixing the real points 410-412 and ghost points 413-418 (i.e. square hollow dots in FIG. 4). Then, a gravity center coordinate of the detected points mixing the real points 410-412 and the ghost points 413-418 may be calculated by the well-known gravity center formula according to the defined axis to obtain a second representative position MP2 for representing an overall position of the real points 410-412 and the ghost points 413-418.

Figure 5:
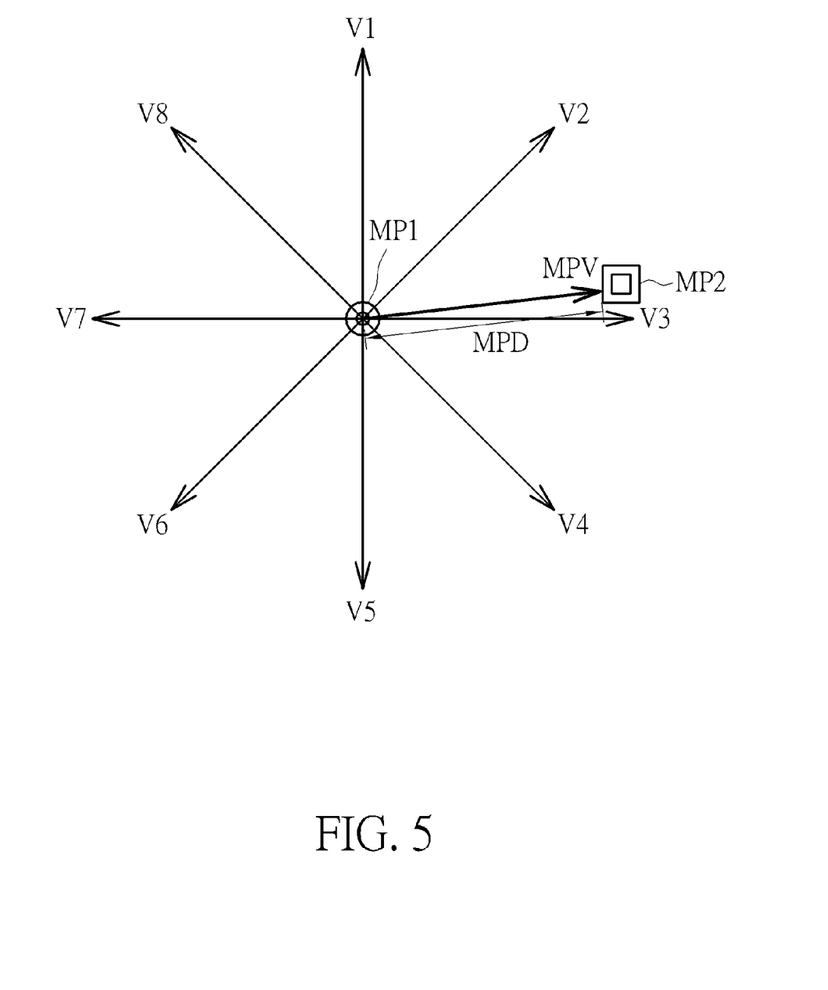
FIG. 5 is a schematic diagram of a first representative position and a second representative position in FIG. 4.

Moreover, please refer to FIG. 5, which is a schematic diagram of the first representative position MP1 and the second representative position MP2 in FIG. 4. As shown in FIG. 5, a direction of a moving vector MPV is from the first representative position MP1 to the second representative position MP2. A value MPD of the moving vector MPV is a relative distance between the first representative position MP1 and the second representative position MP2. Furthermore, by comparing angles between the moving vector MPV and pre-defined comparing vectors V1-V8, the angle between the moving vector MPV and the comparing vector V3 may be determined as the smallest angle of the comparisons. Therefore, the direction of the moving vector MPV may be regarded as a direction of the comparing vector V3, i.e. a direction of horizontally moving right. A number of the comparing vectors may be increased or decreased according to a required resolution of the touch control system, and is not limited. For example, an angle of 360 degrees is divided into the eight comparing vectors V1-V8 according to the embodiment in FIG. 5, that is, regardless of the actual direction of the touch gesture (i.e. the direction of the moving vector MPV), the touch control system only selects one of the comparing vectors V1-V8, which has the angle closest to the angle of the actual direction as the direction corresponding to the touch gesture.

Figure 6:
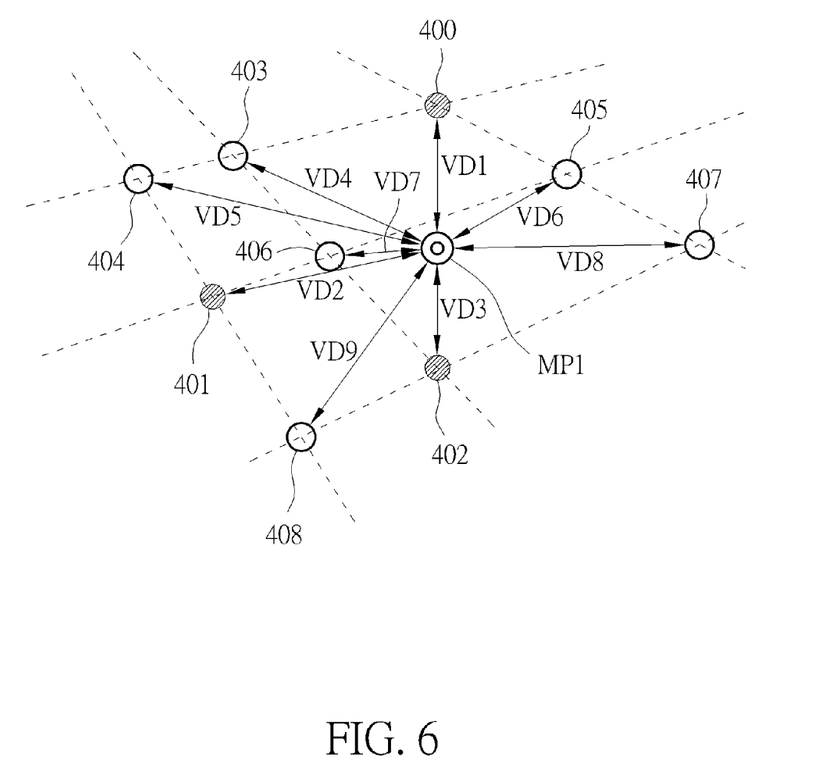
FIG. 6 is a schematic diagram of real points, ghost points, and a first representative position in FIG. 4.

Please refer to FIG. 6, which is a schematic diagram of the real points 400-402, the ghost points 403-408, and the first representative position MP1 in FIG. 4. As shown in FIG. 6, relative distances from the real points 400-402 and the ghost points 403-408 to the first representative position MP1 are respectively first distributing distances VD1-VD9. The first distributing distances VD1-VD9 may be averaged to obtain first distributing average for representing an overall distributing degree of the detected points mixing the real points 400-402 and the ghost points 403-408. Similarly, relative distances from the real points 410-412 and the ghost points 413-418 to the second representative position MP2 may be averaged to obtain second distributing average for representing an overall distributing degree of the detected points mixing the real points 410-412 and the ghost points 413-418.

Thereby, a ratio of the second distributing average relative to the first distributing average is the distributing variation for representing a variation of the distributing degree of the real points 410-412 and the ghost points 413-418 at the second time point relative to the real points 400-402 and the ghost points 403-408 at the first time point. Therefore, when the distributing variation is greater than the properly defined zooming judgment value, a distribution of the real points 410-412 and the ghost points 413-418 at the second time point may be determined to be diffuser than a distribution of the real points 400-402 and the ghost points 403-408 at the first time point, so as to easily determine the touch gesture as the zoom-in gesture. In addition, when the distributing variation is less than the zooming judgment value, the touch gesture may also be easily determined as the zooming-out gesture.

For example, when the first distributing average at the first time point is equal to the second distributing average at the second time point, the distributing variation is equal to 1. Thus, when the zooming judgment value is also configured as 1, if the distributing variation is greater than 1, the touch gesture is determined as the zoom-in gesture, and if the distributing variation is less than 1, the touch gesture is determined as the zoom-out gesture. Actually, the zooming judgment value may also be configured as a range between 0.8 and 1.2 to deal with reasonable sensitivity. In such a condition, the touch gesture is determined as the zoom-in gesture when the distributing variation is greater than 1.2, and the touch gesture is determined as the zoom-out gesture when the distributing variation is less than 0.8.

In short, in the embodiment, the representative position and the distributing variation of the detected points are determined by the defined axis, and the touch gesture is determined according to the variation of the representative position and the distributing variation between the two time points. As a result, the multi-touch gesture may be determined by the optical touch control system only having the two detectors, and the optical touch control system does not require determining the positions of the real points by the complex algorithms and by adding the detectors, so as to reduce the determining hardware cost and complexity to save power.

Furthermore, the determination device 200 may determine the command corresponding to the touch gesture according to the requirement of the host device 202, and the determination device 200 transmits the information corresponding to the command to the host device 202 by the transmission media NET, such that the touch gesture performed by the user may be determined and converted to the command for controlling the operations of the host device 202.

First, the host device 202 first determines a point number of the touch points corresponding to the touch gesture by the detector 222 or the detector 224, and the host device 202 transmits the point number to the determination device 200. The determination device 200 properly configures a point number judgment value as a point number of the touch points, which may be accurately determined, according to a number of the detectors in the host device 202 and capability of the determining algorithms.

Then, when the point number of the touch points corresponding to the touch gesture is greater than the point number judgment value, since the determination device 200 may not determine the real points among the detected points corresponding to the touch gesture, the determination device 200 determines the touch gesture according to the process 30 and determines the touch gesture as the control command to generate the control information corresponding to the touch gesture to the host device 202. For example, when the host device 202 is the optical touch computer, the determination device 200 may generate the control information corresponding to the moving gesture with the right moving direction, and the determination device 200 transmits the control information to the host device 202, such that the host device 202 may perform the pre-defined operations, such as switching windows, according to the control information.

When the point number of the touch points corresponding to the touch gesture is less than the point number judgment value, since the determination device 200 may determine the real points among the detected points corresponding to the touch gesture, the determination device 200 may determine the touch gesture as the coordinate command or the control command according to a command setting value. When the command setting value indicates that the touch gesture is determined as the control command, the determination device 200 generates the control information corresponding to the touch gesture to the host device 202. When the command setting value indicates that the touch gesture is determined as the coordinate command, the determination device 200 generates the coordinate information corresponding to the touch gesture to the host device 202. For example, when the host device 202 is the optical touch computer and the command setting value indicates that the touch gesture is determined as the coordinate command, the determination device 200 generates the coordinate information of the touch points corresponding to the touch gesture to the host device 202, such that the host device 2020 may perform the pre-defined operations, such as executing a window when the coordinates of the touch points are located a specific area, according to the coordinate information.

In the embodiment, since the host device 202 has the two detectors 222, 224, the point number judgment value may be configured as 2, that is, the determination device 200 may easily determine the positions of the touch points corresponding to the touch gesture having two touch points. At this moment, when the user performs the touch gesture having five touch points on the host device 202, the determination device 200 may receive the point number of the touch points detected by the host device 202 and obtains the point number to be 5. Thus, the determination device 200 compares the point number with the point number judgment value and determines that the point number is greater than the point number judgment value. Then, the determination device 200 determines the touch gesture as the control command and transmits the control information corresponding to the control command to the host device 202.

For example, when the host device 202 is the optical touch computer, the determination device 200 may regard as a keyboard of the host device 202 and transmits the control information, such as hotkey information of the keyboard, to the host device 202. Then, the user may control the host device 202 to perform the operations, such as sliding windows or switching windows, similar to the hotkeys operations of the keyboard by the touch gesture having five touch points, which may be the moving gesture or the zooming gesture in FIG. 3.

Furthermore, when the user performs the touch gesture having two touch points on the host device 202, the determination device 200 may easily determine the two real points among the detected points according to a characteristic of the detecting signals. Additionally, the determination device 200 compares the point number with the point number judgment value and determines that the point number is less than or equal to the point number judgment value. Then, the determination device 200 determines the touch gesture as the control command or the coordinate command according to the command setting value of the host device 202. When the command setting value of the host device 202 indicates that the touch gesture is determined as the control command, the determination device 200 transmits the control information corresponding to the control command to the host device 202. When the command setting value of the host device 202 indicates that the touch gesture is determined as the coordinate command, the determination device 200 transmits the coordinate information to the host device 202 according to the determined positions of the two real points.

For example, when the host device 202 is the optical touch computer, the determination device 200 may transmits the coordinate information of the two touch points to the host device 200. The user may control the host device 202 to draw in a drawing application program by the coordinate information of the two touch points, or the user may open a specific window or a specific function when the two touch points are located in a specific area.

Figure 7:
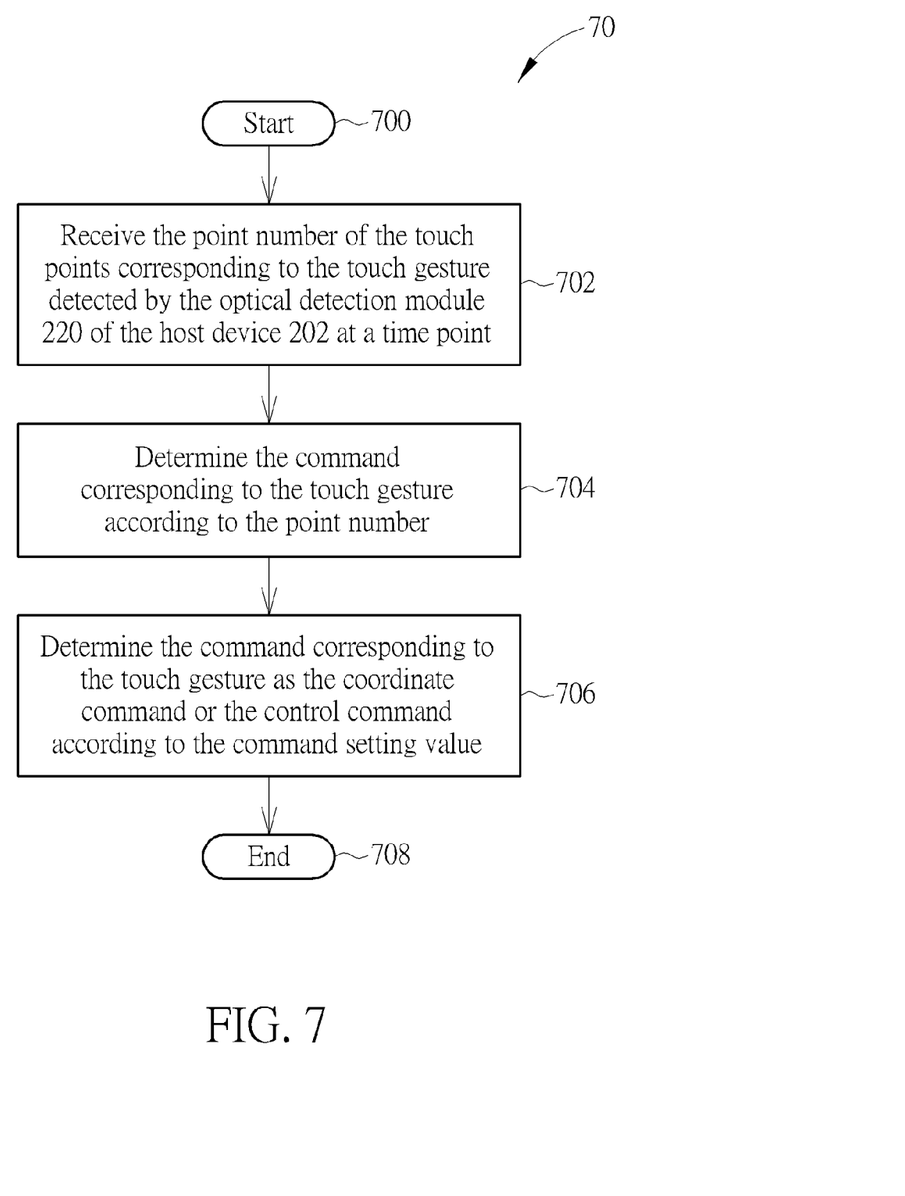
FIG. 7 is a schematic diagram of a process according to an embodiment of the present invention.

The operations of determining the command in the determination device 200 may also be further summarized as a process 70 for determining the command corresponding to the touch gesture. In the embodiment, the process 70 is performed in the determination device 200 in FIG. 2, and may also be compiled as the program code 214 to be stored in the storage device 211 for controlling the processor 210 to perform the process 70.

As shown in FIG. 7, the process 70 includes the following steps:

Step 700: start.

Step 702: receive the point number of the touch points corresponding to the touch gesture detected by the optical detection module 220 of the host device 202 at a time point.

Step 704: determine the command corresponding to the touch gesture according to the point number.

Step 706: determine the command corresponding to the touch gesture as the coordinate command or the control command according to the command setting value.

Step 708: end.

According to the process 70, the determination device 200 may properly configure the point number judgment value as the point number of the touch points, which may be accurately determined, according to the number of the detectors in the host device 202 and the capability of the determining algorithms to determine the touch gesture as the control command or the coordinate command. Moreover, when the determination device 200 may accurately determine the positions of the touch points corresponding to the touch gesture, the determination device 200 may also determine the touch gesture as the control command or the coordinate command according to the command setting value. As a result, the hardware cost and the calculating complexity of the determination device 200 may be reduced according to the requirements, and the determination device 200 may flexibly select the required command corresponding to the touch gesture.

Specifically, the touch control system of the present invention does not require to accurately determine the real points of the multiple detected points, and the touch control system determines the basic touch gesture according to the moving vector and the distributing variation of the detected points. Thereby, more hardware cost is not required to obtain more determining information and the complex calculation is not required to analyze the detecting signals to save the cost and the power, so as to be more adapted to the optical touch control system. Those skilled in the art can make modifications or alterations accordingly. For example, in the embodiment, the touch gesture is first determined as the moving gesture or the zooming gesture according to the value of the moving vector, and then the touch gesture is further determined as the zoom-in gesture or the zoom-out gesture according to the distributing variation. However, in other embodiments, the touch gesture may also be determined as the moving gesture or the zooming gesture according to the value of the moving vector and the distributing variation, and then the touch gesture is further determined as the zoom-in gesture or the zoom-out gesture according to the distributing variation.

For example, the touch gesture is determined as the moving gesture when the value of the moving vector is greater than the moving judgment value and the distributing variation is less than the zooming judgment value. Otherwise, the touch gesture is determined as the zooming gesture to be further determined as the zoom-in gesture or the zoom-out gesture according to the distributing variation. The method, which utilizes the moving vector for representing the overall moving of the detected points and the distributing variation for representing the variation of the overall distributing degree of the detected points to determine the touch gesture, is all applied to the present invention.

Furthermore, in the embodiment, the representative position for representing the overall position of the detected points is obtained by calculating the gravity center coordinate of the detected points and the overall distributing degree of the detected points are obtained by calculating the relative distances between the detected points and the representative position. In other embodiments, the representative position for representing the overall position of the detected points may also be obtained by calculating a center coordinate of the detected points or a coordinate with other feature, and the overall distributing degree of the detected points may also be obtained by only calculating the relative distances, which are less than a threshold, between the detected points and the representative position.

In addition, in the embodiment, the touch control system 20 includes the determination device 200 and the host device 202. The host device 202 detects the touch points, and the determination device 200 determines the touch gesture according to the detecting result of the host device 202. In other embodiments, the touch control system 20 may be an integrated touch device. The touch device may detect the touch points and simultaneously performs the process of determining the touch gesture and the command. The transmission media NET is not required for transmitting the determining result and the command information according to the universal serial bus (USB) standard, or another standard, etc.

Moreover, in the embodiment, the process 70 for determining the touch gesture as the command first determines the command corresponding to the touch gesture according to the point number of the touch points, and then determines the command corresponding to the touch gesture according to the command setting value of the host device. In other embodiments, the process 70 may also first determines the command corresponding to the touch gesture according to the command setting value of the host device, and then determines the command corresponding to the touch gesture according to the point number of the touch points, or determines the command corresponding to the touch gesture only according to the command setting value of the host device.

For example, when the determination device 200 first determines the command corresponding to the touch gesture according to the command setting value of the host device 202 and the determination device 200 may not determine the real points among the detected points, the determination device 200 may also transmit the coordinate information of the representative position of the detected points to the host device 202, such that the host device 202 may perform the related operations according to the coordinate information of the representative position.

Notably, in the embodiment, the optical touch control system is provided for simplifying the complexity of determining the multi-touch gesture to save the hardware cost and the power. In other embodiments, the touch control system may also be a capacitive or a resistive touch control system. Although the capacitive or the resistive touch control system may easily determine the positions of the touch points, the capacitive or the resistive touch control system may rapidly determine the touch gesture according to the overall moving or distributing variation of the touch points to save the calculating power and time and reduce the hardware cost.

In summary, in the prior art, the optical touch control system only having the two detectors requires a smarter artificial intelligence and the more complex determining algorithms to analyze and determine the multi-touch gesture according to the intensity distribution of the signals. In comparison, the present invention utilizes the moving vector and the distribution variation for representing the moving of the overall position and the variation of the distributing degree to easily determine the multi-touch gesture. Therefore, the present invention does not require more hardware and the complex algorithms, and may reduce the hardware cost and the calculating complexity to save the power.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. A method of determining a touch gesture for a touch control system, the method comprising:

detecting at least one first touch point corresponding to the touch gesture on a touch surface at a first time point to generate a first detecting result;

detecting at least one second touch point corresponding to the touch gesture on the touch surface at a second time point to generate a second detecting result;

obtaining a moving vector and a distributing variation corresponding to the touch gesture according to a relationship of the first detecting result and the second detecting result; and determining the touch gesture on the touch surface according to the moving vector and the distributing variation.

2. The method of claim 1, wherein the touch control system is an optical touch control system, the first detecting result comprises at least one first real point and at least one first ghost point detected from the at least one first touch point, and the second detecting result comprises at least one second real point and at least one second ghost point detected from the at least one second touch point.

3. The method of claim 1, wherein the step of obtaining the moving vector and the distributing variation corresponding to the touch gesture according to the relationship of the first detecting result and the second detecting result comprises:

determining a first representative position and a first distributing average corresponding to the at least one first touch point according to the first detecting result;

determining a second representative position and a second distributing average corresponding to the at least one second touch point according to the second detecting result;

obtaining the moving vector according to a relative change between the first representative position and the second representative position; and obtaining the distributing variation according to a relative ratio between the first distributing average and the second distributing average.

4. The method of claim 1, wherein the step of determining the touch gesture on the touch surface according to the moving vector and the distributing variation further comprises:

determining the touch gesture as a zoom-out gesture when the distributing variation is less than a zooming judgment value.

5. The method of claim 3, wherein the first representative position is a first gravity center coordinate corresponding to the at least one first touch point, the second representative position is a second gravity center coordinate corresponding to the at least one second touch point, and a direction and a value of the moving vector are respectively a direction and a distance from the first gravity center coordinate to the second gravity center coordinate.

6. The method of claim 3, wherein the first distributing average is an average of at least one relative distance from the at least one first touch point to the first representative position, the second distributing average is an average of at least one relative distance from the at least one second touch point to the second representative position, and the distributing variation is a ratio of the second distributing average relative to the first distributing average.

7. The method of claim 1, wherein the step of determining the touch gesture on the touch surface according to the moving vector and the distributing variation comprises:

determining the touch gesture as a moving gesture when a value of the moving vector is greater than a moving judgment value, and determining the touch gesture as a zooming gesture or a gesture with no meaning when the value of the moving vector is less than the moving judgment value.

8. The method of claim 1, wherein the step of determining the touch gesture on the touch surface according to the moving vector and the distributing variation further comprises:

determining the touch gesture as a zoom-in gesture when the distributing variation is greater than a zooming judgment value.

9. The method of claim 1, further comprising:

detecting a point number of at least one touch point corresponding to the touch gesture at a time point; and determining a command corresponding to the touch gesture according to the point number.

10. The method of claim 9, further comprising:

determining the command as a control command and generating a control information when the point number is greater than a point number judgment value, and determining the command as a coordinate command or the control command according to a command setting value when the point number is less than the point number judgment value.

11. The method of claim 10, further comprising:

generating a control information when the command setting value indicates that the command is the control command, and generating a coordinate information when the command setting value indicates that the command is the coordinate command.

12. A touch control system comprising:

a detection module, for detecting at least one touch point; and a determination device, comprising:

a processor; and a storage device storing a program code for indicating the processor to perform a method of determining a touch gesture, and the method comprising:

receiving a first detecting result generated by the detection module detecting at least one first touch point corresponding to the touch gesture on a touch surface at a first time point;

receiving a second detecting result generated by the detection module detecting at least one second touch point corresponding to the touch gesture on the touch surface at a second time point;

obtaining a moving vector and a distributing variation corresponding to the touch gesture according to a relationship of the first detecting result and the second detecting result; and determining the touch gesture on the touch surface according to the moving vector and the distributing variation.

13. The touch control system of claim 12, wherein the touch control system is an optical touch control system and the detection module is an optical detection module comprising two detectors for detecting the at least one touch point.

14. The touch control system of claim 12, wherein the touch control system is an optical touch control system, the first detecting result comprises at least one first real point and at least one first ghost point detected from the at least one first touch point, and the second detecting result comprises at least one second real point and at least one second ghost point detected from the at least one second touch point.

15. The touch control system of claim 12, wherein the step of obtaining the moving vector and the distributing variation corresponding to the touch gesture according to the relationship of the first detecting result and the second detecting result comprises:

determining a first representative position and a first distributing average corresponding to the at least one first touch point according to the first detecting result;

determining a second representative position and a second distributing average corresponding to the at least one second touch point according to the second detecting result;

obtaining the moving vector according to a relative change between the first representative position and the second representative position; and obtaining the distributing variation according to a relative ratio between the first distributing average and the second distributing average.

16. The touch control system of claim 15, wherein the first representative position is a first gravity center coordinate corresponding to the at least one first touch point, the second representative position is a second gravity center coordinate corresponding to the at least one second touch point, and a direction and a value of the moving vector are respectively a direction and a distance from the first gravity center coordinate to the second gravity center coordinate.

17. The touch control system of claim 15, wherein the first distributing average is an average of at least one relative distance from the at least one first touch point to the first representative position, the second distributing average is an average of at least one relative distance from the at least one second touch point to the second representative position, and the distributing variation is a ratio of the second distributing average relative to the first distributing average.

18. The touch control system of claim 12, wherein the step of determining the touch gesture on the touch surface according to the moving vector and the distributing variation comprises:

determining the touch gesture as a moving gesture when a value of the moving vector is greater than a moving judgment value, and determining the touch gesture as a zooming gesture or a gesture with no meaning when the value of the moving vector is less than the moving judgment value.

19. The touch control system of claim 12, wherein the step of determining the touch gesture on the touch surface according to the moving vector and the distributing variation further comprises:

determining the touch gesture as a zoom-in gesture when the distributing variation is greater than a zooming judgment value.

20. The touch control system of claim 12, wherein the step of determining the touch gesture on the touch surface according to the moving vector and the distributing variation further comprises:

determining the touch gesture as a zoom-out gesture when the distributing variation is less than a zooming judgment value.

21. The touch control system of claim 12, the method further comprising:

detecting a point number of the at least one touch point corresponding to the touch gesture at a time point; and determining a command corresponding to the touch gesture according to the point number.

22. The touch control system of claim 21, the method further comprising:

determining the command as a control command and generating a control information when the point number is greater than a point number judgment value, and determining the command as a coordinate command or the control command according to a command setting value when the point number is less than the point number judgment value.

23. The touch control system of claim 22, the method further comprising:

generating a control information when the command setting value indicates that the command is the control command, and generating a coordinate information when the command setting value indicates that the command is the coordinate command.

* * * * *